Nov. 30, 1954     B. H. BLAIR ET AL     2,695,780
SPRING CLIP
Filed Sept. 19, 1952
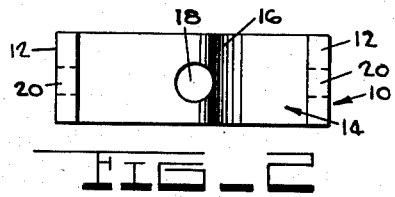
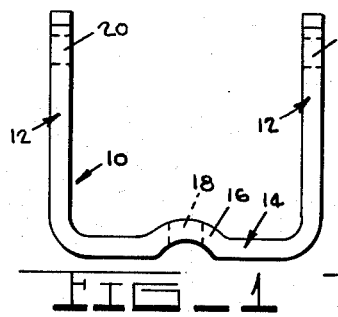
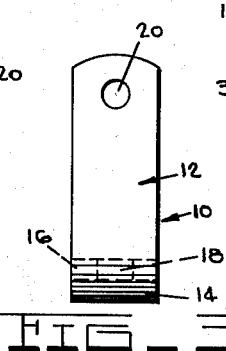
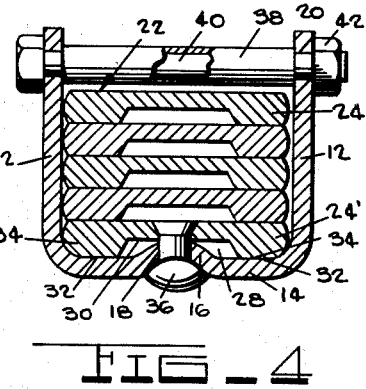
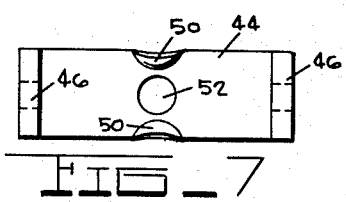
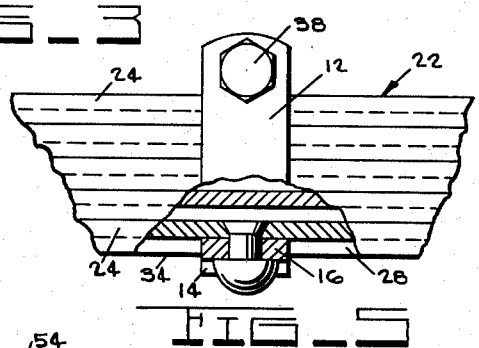
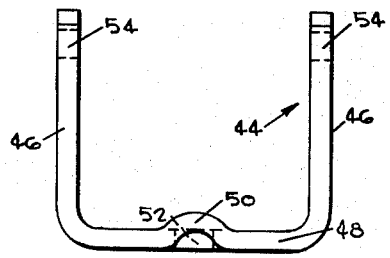
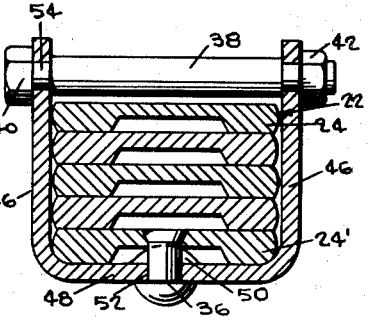
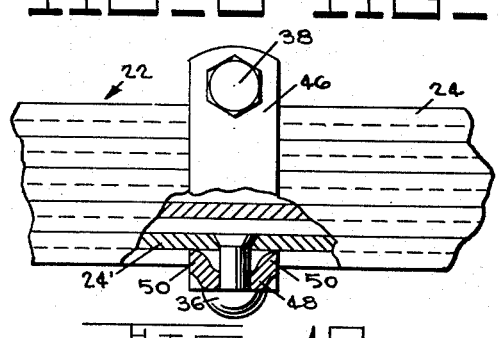
*INVENTOR.*
BEN H. BLAIR
RAYMOND P. BOWEN
BY
*McDonald & Feagins*
ATTORNEYS

United States Patent Office 2,695,780
Patented Nov. 30, 1954

2,695,780

SPRING CLIP

Ben H. Blair, Grosse Pointe, and Raymond P. Bowen, Detroit, Mich., assignors to Eaton Manufacturing Company, Cleveland, Ohio, a corporation of Ohio Application September 19, 1952, Serial No. 310,502

8 Claims. (Cl. 267—53)

This invention relates to spring clips and more particularly to spring clips of novel design for application to leaf spring assemblies for supporting same in prescribed assembly.

Broadly the invention relates to the provision of spring clips for leaf spring assemblies of automotive vehicles and the like wherein the spring leaves are of the grooved steel variety and a portion of each spring clip is formed for receipt in the groove of a spring leaf surface in engagement with the bottom of the groove. As such the spring clip can be fixedly secured to the leaf spring assembly without distorting the clips.

An object of the invention is the provision of a spring clip for a grooved type spring leaf assembly that can be assembled in fixed relation to one of the leaves of the assembly without distorting the clip.

Another object of the invention is the provision of spring clip having a rib or protuberance on a portion thereof for receipt in the groove of a grooved type spring leaf of a spring leaf asembly in abutting engagement with the bottom of the groove for riveted securement thereto.

Other objects and advantages of the invention will appear from the following description taken in connection with the drawings forming a part of the specification, and in which:

Fig. 1 is a front elevation view of a spring clip embodying the invention;
Fig. 2 is a top elevation view of Fig. 1;
Fig. 3 is a side elevation view of Fig. 1;
Fig. 4 is a cross-sectional view showing the clip of Fig. 1 in assembled relation on a leaf spring assembly;
Fig. 5 is a side elevation partly broken away view of Fig. 4; and
Figs. 6 through 10 are corresponding views to Figs. 1 through 5 respectively, of a modified form of spring clip from that of Figs. 1 through 3 and its assembled relation to a leaf spring assembly.

Similar reference characters indicate corresponding parts throughout the several views of the drawings.

Referring to Figs. 1 through 5 of the drawings for more specific details of the invention 10 represents generally a spring clip or strap including a pair of parallel legs 12 joined together by a connecting part 14 arranged substantially at right angles to legs 12.

Part 14 is shaped intermediate the legs 12 to provide a rib 16 extending across the full width of the clip, in the same direction as the legs do, away from portion 14, the purpose of which will hereinafter appear. A hole 18 is provided through the rib 16 and a hole 20 is provided through the legs 12, near the free ends thereof, in coaxial relation to one another, the purpose of which will hereinafter appear.

Spring clip 10 is adapted to be applied to a leaf spring assembly 22 as shown by Figs. 4 and 5 wherein the leaves 24 of assembly 22 are of the longitudinal grooved type and the lowermost leaf 24' of the assembly is provided with a hole 26 corresponding in size and location to hole 18 in the clip. Rib 16 is adapted to be received in groove 28 of leaf 24' and is of such height corresponding substantially with the depth of groove 28 to provide for the abutting engagement of the crest of rib 16 on the leaf 24' upon bottom wall 30 of the groove and with the inner faces 32 of part 14 of the clip engaging the longitudinal faces 34 of the leaf 24' bordering groove 28. With the rib in groove 28 the holes 18 and 26 in the respective clip 10 and spring leaf 24', a rivet 36 is employed to fixedly secure the clip and spring leaf together.

A sleeve 38 of predetermined length is received between the legs 12 and a bolt 40 is in turn inserted through the sleeve whereupon a nut 42 is applied at one end of the bolt effective upon the tightening up thereof to bring the legs together to the extent permitted by the sleeve length. In this way a predetermined clearance between the longitudinal edges of the spring leaves 24 and the inner surfaces of legs 12 is provided as well as clearance between the outer peripheral surface of sleeve 38 and the topmost leaf 24 whereby the leaves 24 and 24' can flex and move longitudinally relative to one another within predetermined limits.

In so providing the rib 16 of such height relative to the depth of groove 28, the rivet can pull the clip and leaf 24' up solid to one another without distorting the clip.

Figs. 6 through 10 illustrate a modified form of spring clip or strap 44 from that of Figs. 1 through 5 and its cooperative association with a leaf spring assembly.

Spring clip 44 includes a pair of legs 46 extending in parallel arrangement to one another and joined together by a connecting part 48 arranged at substantially right angles to the legs 42.

Part 48 intermediate the legs 46 is provided with a pair of protuberances 50 disposed at the outer edges of the part 48 of clip 44, oppositely disposed to one another and extending in the general direction that the legs 46 extend away from part 48. A hole 52 is provided through part 48 intermediate the protuberances 50. A pair of coaxial holes 54 are provided in the legs 46 near the free ends thereof and serve a like purpose as holes 20 in legs 12.

Spring clip 44 is applicable to a leaf spring assembly 22 likewise as clip 10. As so applied thereto the protuberances 50 are received in groove 28 of spring leaf 24' and by reason of the height thereof being substantially equal to the depth of groove 28, they engage the bottom of the groove upon the riveting of the clip 40 to leaf 24'. Thus a solid connection is had between the clip 44 and spring leaf 24' without distorting the clip. Clip 44 likewise as clip 10 bears a similar relation to the leaf spring assembly 22 in that the legs 46 are secured in desired relation to one another by sleeve, bolt and nut assembly 38, 40 and 42 as shown by Figs. 9 and 10.

In the case of both clips 10 and 44 they are made of flat metal stock of substantially uniform width and wherein through appropriate machining operations the form shown by Figs. 1 and 6 is given thereto. Rib 16 as well as protuberances 50 of the respective clips 10 and 44 are stamped out of the normal plane of the flat metal stock of which the clip is made to serve their intended purpose.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. In combination with a leaf spring assembly, a spring clip having a protuberance, a leaf of the spring assembly having a longitudinal groove therein, said protuberance being received in the groove of the leaf in engagement with the portion of the leaf constituting the bottom of the groove and means fixedly securing the clip to the leaf.

2. In combination with a leaf spring assembly, a spring clip having a raised portion of predetermined height, a leaf of the spring assembly having a longitudinal groove of substantially equal depth to the height of the raised portion on the clip receiving the raised portion in the groove with the top of the raised portion substantially engaging the portion of the leaf constituting the bottom of the groove and means securing the clip in solid engagement with the leaf.

3. In combination with a leaf spring assembly, a spring clip adapted to substantially encircle the leaf spring assembly including a part having an inwardly ribbed portion, a leaf of the spring assembly having a groove centrally thereof longitudinally of its length receiving the ribbed portion in the groove with the apex of the ribbed portion engaging the bottom wall of the groove and with the surface of the part adjacent the ribbed portion engaging a portion of the surface of the leaf adjacent the groove and a rivet securing the leaf and clip in solid assembly at their surfaces of engagement.

4. In combination with a leaf spring assembly, a spring clip including a pair of substantially parallel legs, and a connecting part for said legs at substantially right angles thereto, a leaf of said spring assembly having a centrally located longitudinal groove on one face surface thereof, said part having ribbed means on an inner surface thereof extending in the direction of the legs of the clip, received in the groove of the leaf with the apex of the ribbed means engaging the portion of the leaf forming the bottom of the groove and means extending through the leaf and part securely clamping the leaf and clip together with the ribbed means in solid abutment against the leaf.

5. In combination with a leaf spring assembly according to claim 4 wherein the ribbed means includes a rib extending across the width of the clamp and wherein the extending means extends through the rib centrally thereof.

6. In combination with a leaf spring assembly according to claim 4 wherein the ribbed means includes a pair of protuberances spaced from one another at the edge of the part of the clip centrally thereof between the legs.

7. In combination with a leaf spring assembly according to claim 6 wherein the extending means extends through the part centrally of the protuberances.

8. A spring clip adapted for securement to a leaf of a leaf spring assembly including a pair of substantially parallel legs and a part joining the legs together having ribbed means centrally thereof extending in the general direction of the legs away from the part, said ribbed means including a pair of spaced protuberances, one at each edge of the part centrally between the legs.

References Cited in the file of this patent

UNITED STATES PATENTS

| Number | Name | Date |
|---|---|---|
| 1,454,568 | Taylor | May 8, 1923 |
| 1,957,933 | Brandl | May 8, 1934 |
| 2,026,599 | Wallace | Jan. 7, 1936 |